US 3,421,948
Patented Jan. 14, 1969

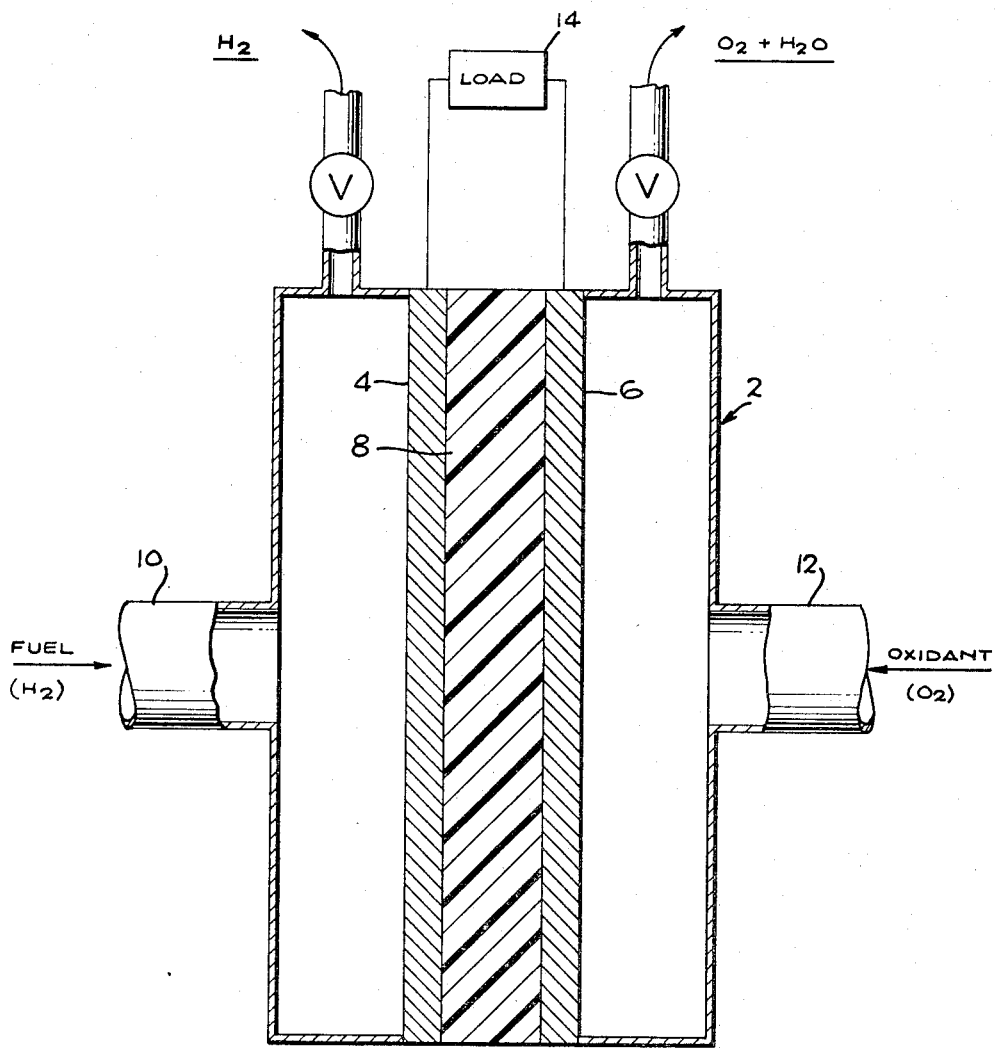

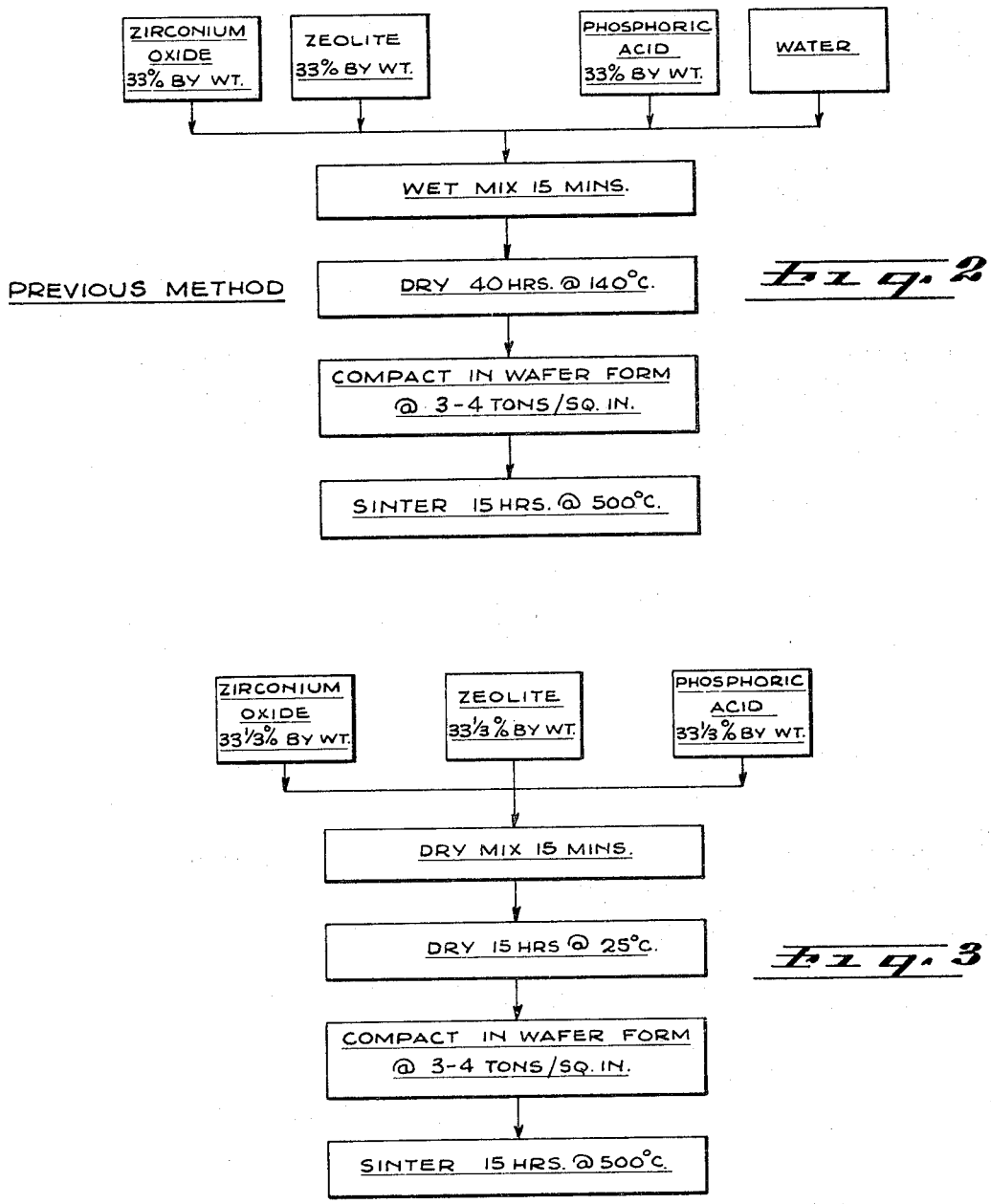

3,421,948
METHOD OF MAKING MEMBRANES
James E. Webb, Administrator of the National Aeronautics and Space Administration with respect to an invention of Frank C. Arrance, Costa Mesa, Calif., and Daniel G. Soltis, West Richfield, Ohio
Filed Apr. 13, 1965, Ser. No. 447,933
U.S. Cl. 136—146     2 Claims
Int. Cl. H01m 3/02

ABSTRACT OF THE DISCLOSURE

This invention teaches an improved method of making an inorganic membrane suited for fuel cell use. Zeolite and a binder, such as zirconium phosphate, are used. Essentially, a mixture of zirconium oxide, phosphoric acid, and zeolite is formed under conditions (such as low temperature and control of the amount of water used) that inhibit bond formation until substantially all physical working of the membrane is complete. Then it is sintered to form the bonds. The resulting membrane is strong, continuous, flexible, can withstand high temperatures, is unaffected by radiation, can be hydrated and dehydrated without ill effect, and has good dimensional stability.

Origin of invention

The invention described herein was made in the performance of work under a NASA contract and is subject to the provisions of Section 305 of the National Aeronautics and Space Act of 1958, Public Law 85–568 (72 Stat. 435; 42 USC 2457).

Background of the invention

This invention relates to a membrane that can be used as an electrolyte in a fuel cell. More particularly this invention relates to an improved method of increasing the physical strength of "solid" inorganic ion exchange membrane of the type shown in the U.S. patent application of A. Levy-Pascal, titled "Zeolite Electrolitic Membranes for Fuel Sells," Ser. No. 447,587, filed Apr. 12, 1965; and assigned to the same assignee as this invention.

One of the things that is taught by the above patent application, is how to make an inorganic membrane. An inorganic membrane has many desirable features when compared to an organic membrane. It is not subject to swelling, has good dimensional stability, has excellent resistance to oxidation, radiation, and due to its high energy of adsorption can withstand higher temperatures. It also can be cycled between complete dehydration followed by hydration without ill effect.

As taught by the above application, a membrane may be made out of zeolite powders and a binder of zirconium phosphate. The binder acts to securely hold the zeolite powders together, so that they can be formed into a wafer that has sufficient physical strength to permit its use as a membrane.

Physical strength is very important in the use of a membrane. Just as an example, a fuel cell employing a membrane electrolyte, may be used in a vehicle adapted for land, underwater or even space travel. The fuel cell may be subjected to all types of shocks and vibrations in use. It is therefore necessary that the membrane have sufficient physical strength to withstand shock, vibration and even high "G" forces without cracking, falling apart or shorting in use.

It follows that the stronger a membrane can be made, the more suited it is for use under adverse conditions.

In view of the above, it is therefore an object of this invention to provide a new method of making a physically stronger membrane than previously could be produced, and that can therefore withstand greater shock, vibration and other adverse physical conditions than could be tolerated in the past.

Another object of this invention is to provide a new method of making a physically stronger membrane than previously could be made, yet requires substantially less time to make the membrane than formerly required.

Another object of this invention is to provide a new method of making a physically stronger membrane than previously could be made, yet requires less steps than formerly necessary.

Summary of the invention

Essentially this invention teaches that a stronger membrane will result if conditions during manufacture are controlled so that the bond forming reaction between the zeolite mineral and the binder is inhibited until substantially all the physical working of the mixture is substantially complete. The technical reasons as to why this should produce a stronger membrane are given later. However, to accomplish the above, such things as control of the amount of water, as well as temperatures as low as practicable are used in the new method to inhibit bond formation. Further, some additional advantages in carrying out the improved method are that less steps are required, and less time is required in making the membrane.

Brief description of drawings

Other objects and advantages will appear from the specification and claims taken in connection with the accompanying drawings wherein:

FIGURE 1 is a cross sectional view of a fuel cell utilizing a membrane electrolyte;

FIGURE 2 is a flow diagram of a previous method of making the zeolite membrane structure; and FIGURE 3 is a flow diagram of the improved method of making the zeolite membrane structure according to the present invention.

Description of preferred embodiment

Referring to FIGURE 1, there is illustrated a fuel cell 2 as background, to show how a "solid" ion exchange membrane made according to this invention can be used.

In general, fuel cell 2 may contain a gas permeable anode electrode 4 and a gas permeable cathode electrode 6. These may be made of porous stainless steel for example. An electrolyte in the form of a "solid" inorganic ion exchange membrane 8, containing a compacted hydrate form of the mineral zeolite, is positioned between and in direct contact with anode electrode 4 and cathode electrode 6.

Means 10 are provided for supplying fuel, as for example hydrogen, to anode electrode 4. And, means 12 are provided for supplying oxidant, as for example oxygen, to cathode electrode 6. A load 14 is electrically connected between electrodes 4 and 6.

Generally, the fuel cell operates when hydrogen gas is fed to anode electrode side 4 of membrane 8 where it is catalytically decomposed into hydrogen ions and its electrons transferred to the anode and travel through the outside load 14 where they perform work, and then to the cathode electrode 6.

The hydrogen ions are transported as hydromium ions by a cation exchange mechanism through the width of membrane 8 toward the cathode.

Meanwhile, oxygen gas is fed to porous cathode 6 where it is picked up by the electrons coming from the anode and combined with the hydrogen ions at the catalyst-zeolite interphase to form water.

The water produced is eliminated from the cell by diffusion through the cathode and evaporation to the outside, or by a wick (not shown) connected to its outer surface.

As mentioned above, membrane 8 is made in the form of wafer containing a compacted hydrate form of the mineral zeolite. In zeolite crystals, the lattice structure is such that the water of hydration or adsorbate is primarily located inside a regular intracrystalline three dimensional cavity network. This permits the crystals to retain their water of hydration under circumstances wherein other materials would become dehydrated. For example one type of synthetic zeolite can retain 60% of its water of hydration at 250° C. when the water vapor pressure is kept at 50 mm. Hg.

With respect to zeolites, about forty different natural crystalline zeolites are known. Also, a number of synthetic zeolites have been developed that possess higher adsorption and ion exchange capabilities than the natural occurring zeolites. Additionally these synthetic zeolites can be modified to a degree, to meet particular needs. See for example U.S. Patent 2,882,243 to R. M. Milton setting forth various types of zeolites, including hydrogen forms. Generally, the formula for zeolites is $M_2Al_8Si_{40}O_{96} \cdot 24H_2O$ where M may be a metal or hydrogen.

Some of the present manufacturers of synthetic zeolites are the Davison Chemical Division of W. R. Grace Co. (by the name of "Microtraps") Linde Division of Union Carbide Corporation (by the name of "Molecular Sieves") and the Norton Co. (by the name of "Zeolon Synthetic Zeolites").

As pointed out in the previously cited patent application, one problem in the use of zeolites per se is that they lack strength and cannot be formed into a strong, continuous and flexible membrane. If they were formed into a membrane, they would fall apart, crack and short in use. However, a membrane can be made with sufficient physical strength if a suitable binder is used to hold the zeolite particles together.

Some of the characteristics of a good binder as taught by the above patent application are: that it is an inorganic material, will securely hold the zeolite particles together, and will pass ions.

An example of a very satisfactory inorganic binder that will pass ions as described in the above patent application is zirconium phosphate. This is formed by the reaction of zirconium oxide, phosphoric acid and the zeolite crystals. Inorganic polymer bonds are formed that bind the zeolite crystals together. These bonds will be referred to later on in discussing the new method.

To aid in understanding the present invention, reference will first be made to the previous method of making a membrane, so that the difference between the new and previous method will be more readily apparent.

An example of the previous method of preparing a membrane as set forth in the above application and as illustrated in FIGURE 2, is as follows.

*Previous method*

| | |
|---|---|
| Zirconium oxide | 33% by weight. |
| Phosphoric acid | 33% by weight. |
| A hydrogen form of zeolite (such as Zelon H made by Norton Co., or Linde A made by Union Carbide Co.) | 33% by weight. |
| Water | Sufficient to aid in mixing. |
| Wet mix | 15 minutes. |

Dry 40 hours at 140° C.
Form at 3-4 tons p.s.i. into wafer shape.
Sinter 15 hours at 500° C.

A membrane made by the above method has a transverse strength of approximately 2400 pounds per square inch. The resultant membrane is comparatively strong, continuous and flexible so that it can be used in a fuel cell.

As mentioned in the above patent application and as repeated here, it is very important to note that when making the membrane, the zeolite should not be heated above its heat stabilization temperature. At the heat stabilization temperature, the ion exchange properties of the zeolite are destroyed and ionization will no longer take place. Without ionization, the membrane cannot function as an electrolyte.

With respect to the new method, an example of the steps that result in a much stronger membrane is illustrated in FIGURE 3 and are as follow.

*New method*

| | |
|---|---|
| Zirconium oxide | 33⅓% by weight. |
| Phosphoric acid | 33⅓% by weight. |
| A hydrogen form of zeolite | 33⅓% by weight. |

Mix dry for 15 minutes.
Air dry 15 hours at 25° C.
Form at 3-4 tons p.s.i. into wafer shape.
Sinter 500° for 15 hours.

It will be noted that in comparing the new with the old method, that the step of adding water has been eliminated. It will be further noted that the mixture is air dried for as little as 15 hours at a relatively low temperature of 25° C. (aproximately room temperature). In the previous method, the mixture was dried for 40 hours at 140° C.

In an attempt to technically explain why the membrane has increased strength when made by the new method, the following is suggested: During the original wet mixing and high temperature drying steps of the previous method, conditions were produced wherein a large portion of the zeolite crystals and binder would react to form the organic polymer bonds. However, because of the following forming step, many of the bonds were physically broken apart due to the later working. As a result, these bonds were "lost" and not available to be formed during the sintering step.

The above may be likened to making a cracker. Before a cracker is baked, the dough can be worked without decreasing the strength of the cracker. However, if the cracker is partially baked, any later working will destroy or weaken the cracker.

The new method operates to control conditions so as to inhibit the amount of reaction taking place until after the mechanical working of the mixture is complete. Thus many of the bonds that were previously broken apart due to later working of the mixture are saved. These bonds are now formed after the mixture has been shaped into finished form and working of the mixture is substantially complete. These bonds are now available to be formed during the sintering step. Thus a much stronger membrane can be made. This is borne out by the increased transverse strength of membranes made by the new method—3770 p.s.i., as compared to 2400 p.s.i. previously—well over a 50% increase in strength.

In summary this invention teaches how to make a membrane that is stronger than previous membranes, requires less time to make the membrane, and is less complicated than previous methods.

The membrane made by the new method has a transverse strength of approximately 3770 p.s.i., as compared to a transverse strength of approximately 2400 p.s.i. when made with the previous method. This is well over a 50% increase in strength of the membrane.

The new method eliminates a step (adding water) and uses lower temperatures, it is more simple. Also, an important advantage in the new method is that over a day is saved (25 hours) in the drying step. The drying step having been reduced to approximately 15 hours, as compared to the 40 hours previously required.

It is noted that while specific proportions, temperatures, pressures, and types of materials are set forth, these are by way of example only, and that it would be apparent to one skilled in the art that variations can be made without departing from the teachings of this invention.

It should be understood that it is not intended to limit the invention to the herein disclosed form, but that the invention includes such other forms or modifications as are embraced by the scope of the appended claims.

What is claimed is:

1. An improved method of making an inorganic membrane comprising the steps of:
   providing a mixture of zeolite, zirconium oxide and phosphoric acid;
   physically working said mixture dry and at approximately room temperature, to inhibit the reaction of said resultant mixture until shaping of said mixture is substantially complete; and then
   sintering said mixture.

2. An improved method of making an inorganic membrane for use as an electrolyte in a fuel cell, comprising the steps of:
   providing a mixture of approximately
      33⅓% by weight zeolite;
      33⅓% by weight zirconium oxide;
      33⅓% by weight phosphoric acid;
   dry mixing said mixture for approximately 15 minutes;
   heating said mixture for approximately
      15 hours at approximately 25° C.;
   shaping said mixture into wafer form under
      approximately 3 tons pressure per square inch; and
   sintering said shaped mixture at approximately 500° C. for approximately 15 hours.

References Cited

UNITED STATES PATENTS

| | | | |
|---|---|---|---|
| 3,266,940 | 8/1966 | Caesar | 136—86 |
| 3,298,839 | 1/1967 | Troell | 106—57 |

WINSTON A. DOUGLAS, *Primary Examiner.*

DONALD L. WALTON, *Assistant Examiner.*

U.S. Cl. X.R.

136—153; 106—57; 252—449; 264—56